US010904149B2

(12) United States Patent
Pignataro et al.

(10) Patent No.: US 10,904,149 B2
(45) Date of Patent: *Jan. 26, 2021

(54) MACHINE LEARNING-DERIVED ENTROPY PATH GRAPH FROM IN-SITU OAM (IOAM) DATA

(71) Applicant: Cisco Technology, Inc., San Jose, CA (US)

(72) Inventors: Carlos M. Pignataro, Raleigh, NC (US); Nagendra Kumar Nainar, Morrisville, NC (US); Rajiv Asati, Morrisville, NC (US); K. Tirumaleswar Reddy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,149

(22) Filed: Aug. 29, 2019

(65) Prior Publication Data
US 2019/0386921 A1 Dec. 19, 2019

Related U.S. Application Data

(63) Continuation of application No. 15/386,306, filed on Dec. 21, 2016, now Pat. No. 10,454,828.

(51) Int. Cl.
*H04L 12/24* (2006.01)
*H04L 12/707* (2013.01)
(Continued)

(52) U.S. Cl.
CPC .............. *H04L 47/12* (2013.01); *H04L 41/12* (2013.01); *H04L 41/5019* (2013.01);
(Continued)

(58) Field of Classification Search
CPC . H04L 41/0803; H04L 41/145; H04L 41/147; H04L 41/5019; H04L 43/045;
(Continued)

(56) References Cited

U.S. PATENT DOCUMENTS 9,094,323 B2 7/2015 Frost
9,210,089 B2 12/2015 Akiya
(Continued)

OTHER PUBLICATIONS

F. Brockners et al.: "Data Formats for In-band OAM", Network Working Group, Internet-Draft, Jul. 8, 2016, https://tools.ietf.org/html/draft-brockners-inband-oam-data-00.
(Continued)

*Primary Examiner* — Alpus Hsu
(74) *Attorney, Agent, or Firm* — Behmke Innovation Group LLC; James M. Behmke; Jonathon P. Western

(57) ABSTRACT

In one embodiment, a device in a network receives in-situ operations administration and management (iOAM) data regarding a plurality of traffic flows in the network. The iOAM data comprises entropy values for the plurality of traffic flows. The device receives network topology information indicative of network paths available in the network. The device generates a machine learning-based entropy topology model for the network based on the received iOAM data and the received network topology information. The entropy topology model maps path selection predictions for the network paths with entropy values. The device uses the entropy topology model to cause a particular traffic flow to use a particular network path.

20 Claims, 9 Drawing Sheets

(51) Int. Cl.
*H04L 12/801* (2013.01)
*H04L 12/911* (2013.01)
*H04L 29/06* (2006.01)
*H04L 12/26* (2006.01)

(52) U.S. Cl.
CPC .............. *H04L 43/14* (2013.01); *H04L 45/24* (2013.01); *H04L 47/829* (2013.01); *H04L 69/22* (2013.01); *H04L 43/045* (2013.01); *H04L 43/10* (2013.01)

(58) Field of Classification Search
CPC ......... H04L 43/12; H04L 45/08; H04L 45/24; H04L 47/12; H04L 47/35; H04L 47/829; H04L 69/22
See application file for complete search history.

(56) References Cited

U.S. PATENT DOCUMENTS

| | | | |
|---|---|---|---|
| 9,276,833 B2 | 3/2016 | Pignataro | |
| 9,350,657 B2* | 5/2016 | Gross, IV | H04L 45/74 |
| 9,608,858 B2 | 3/2017 | Asati | |
| 9,800,497 B2* | 10/2017 | Kapadia | H04L 45/64 |
| 9,838,272 B2* | 12/2017 | Djukic | H04L 41/5009 |
| 9,967,191 B2 | 5/2018 | Frost | |
| 9,992,056 B2* | 6/2018 | Ward | H04L 12/4633 |
| 10,063,447 B2 | 8/2018 | Pignataro | |
| 10,270,690 B2 | 4/2019 | Pignataro | |
| 10,453,117 B1* | 10/2019 | Reavely | G06F 40/30 |
| 10,482,885 B1* | 11/2019 | Moniz | G06F 3/167 |
| 2013/0279503 A1* | 10/2013 | Chiabaut | H04L 45/44 370/389 |
| 2015/0319077 A1 | 11/2015 | Vasseur | |
| 2016/0020941 A1 | 1/2016 | Asati | |
| 2016/0315850 A1 | 10/2016 | Dara | |
| 2017/0111209 A1 | 4/2017 | Ward | |
| 2017/0324651 A1 | 11/2017 | Penno | |
| 2017/0366456 A1 | 12/2017 | Dara | |
| 2018/0062991 A1 | 3/2018 | Nainar | |
| 2018/0091426 A1 | 3/2018 | Bao | |

OTHER PUBLICATIONS

F. Brockners et al.: "Requirements for In-band OAM", Network Working Group, Internet-Draft, Jul. 8, 2016, https://tools.ietf.org/html/draft-brockners-inband-oam-requirements-00.

F. Brockners et al.: "Encapsulations for In-band OAM Data", Network Working Group, Internet-Draft, Jul. 8, 2016, https://tools.ietf.org/html/draft-brockners-inband-oam-transport-00.

F. Brockners et al.: "Data Formats for In-situ OAM", Network Working Group, Internet-Draft, Oct. 30, 2016, https://tools.ietf.org/html/draft-brockners-inband-oam-data-02.

F. Brockners et al.: "Requirements for In-situ OAM", Network Working Group, Internet-Draft, Oct. 30, 2016, https://tools.ietf.org/html/draft-brockners-inband-oam-requirements-02.

F. Brockners et al.: "Encapsulations for In-situ OAM Data", Network Working Group, Internet-Draft, Oct. 30, 2016, https://tools.ietf.org/html/draft-brockners-inband-oam-transport-02.

F. Brockners et al.: "In-situ OAM—Update", IETF 97—OPSAWG, Nov. 14, 2016.

Boyan, et al., "Packet Routing in Dynamically Changing Networks: A Reinforcement Learning Approach", NIPS'93 Proceedings of the 6th International Conference on Neural Information Processing Systems, pp. 671-678, 1993, Morgan Kaufmann Publishers Inc.

Kompella, et al., "Detecting Multi-Protocol Label Switched (MPLS) Data Plane Failures", Request for Comments 4379, Feb. 2006, 50 pages, The Internet Society.

Nordmark, et al., "Encapsulation Considerations", RTGWG Internet Draft, <draft-ietf-rtgwg-dt-encap-02>, Oct. 31, 2016, 35 pages, Internet Engineering Task Force Trust.

https://en.wikipedia.org/wiki/Equal-cost_multi-path_routing; Equal-Cost Multi-Path Routing, Wikipedia, Sep. 2016; 2 pages.

Brockners, et al., "In-Band OAM", IETF 96—OPSWG, Jul. 19, 2016, 17 pages.

\* cited by examiner

MACHINE LEARNING-DERIVED ENTROPY PATH GRAPH FROM IN-SITU OAM (IOAM) DATA

RELATED APPLICATION

This application is a continuation of U.S. patent application Ser. No. 15/386,306, filed on Dec. 21, 2016, entitled MACHINE LEARNING-DERIVED ENTROPY PATH GRAPH FROM IN-SITU OAM (iOAM) DATA, by Carlos M. Pignataro, et al., the contents of which are incorporated herein by reference.

TECHNICAL FIELD

The present disclosure relates generally to computer networks, and, more particularly, to using a machine learning-derived entropy path graph from in-situ, operations, administration, and management (iOAM) data.

BACKGROUND

Equal-Cost Multi-Path (ECMP) routing refers to a strategy in which traffic can flow over any number of different network paths that share the same cost to a given destination. Typically, ECMP is used for various purposes including capacity planning, path validation, load sharing, and the like. As ECMP can be used with many of the various routing protocols available, ECMP is in wide use in many networks.

Entropy labels, for example, are "random" label values included in a header field (e.g., an Internet Protocol (IP) header or a Multiprotocol Label Switched (MPLS) label stack) of a packet to facilitate ECMP based load-balancing ("flow entropy"). Without entropy labels in a network where devices (e.g., label-switching routers (LSRs)) are performing ECMP solely on the basis of the header field, packets with the same forwarding information (e.g., header/label stack) will typically all follow the same path since most ECMP implementations use the forwarding information (e.g., header/label stack) as the input to hash-based, load-balancing processes. When multiple flows have the same forwarding information this means they cannot be effectively load-balanced. Entropy labels solve this problem by giving the source router the ability to "tag" different flows with different entropy label values, resulting in different headers/label stacks for different flows and better ECMP load-balancing.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
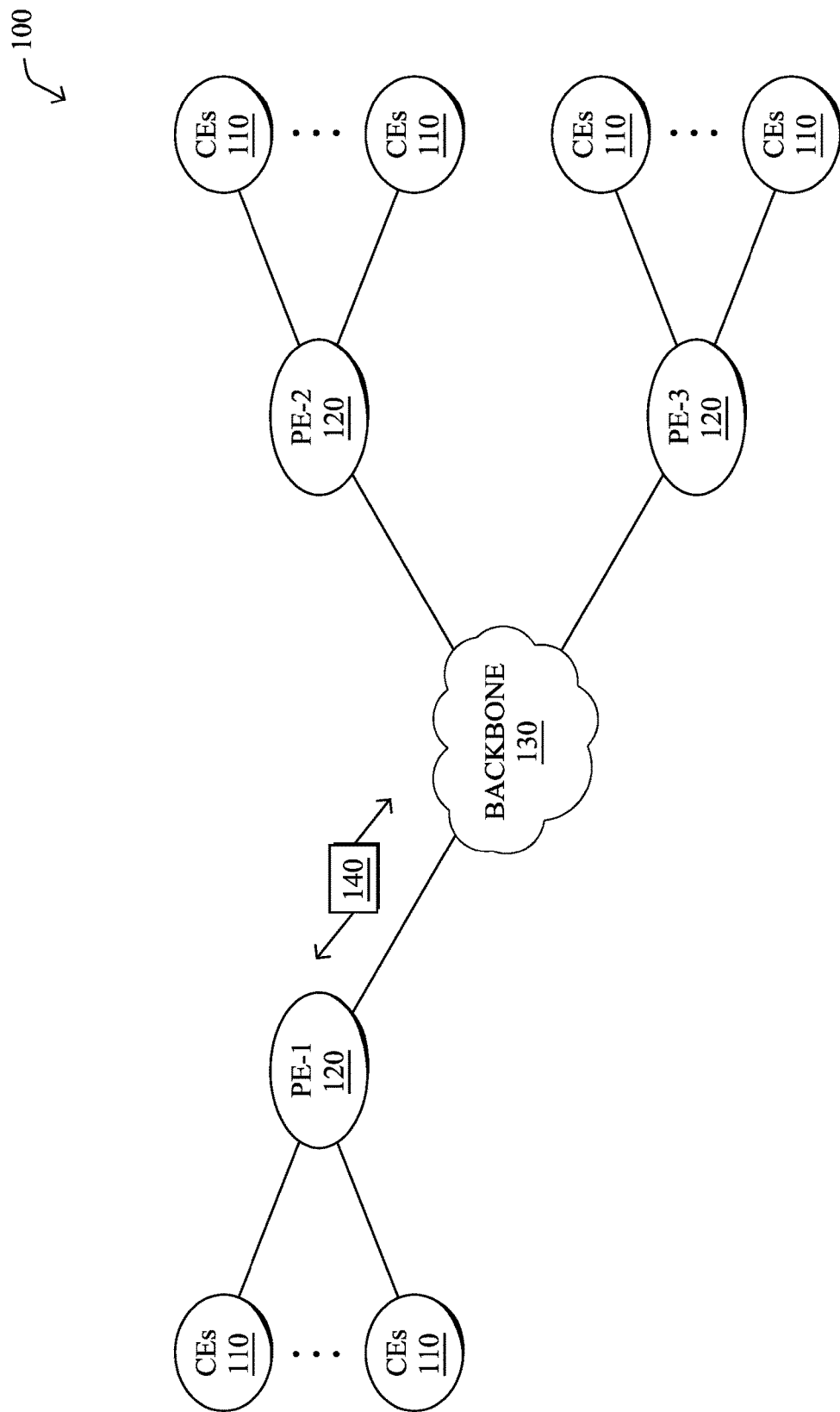
FIGS. 1A-1B illustrate an example communication network.

According to one or more embodiments of the disclosure, a device in a network receives in-situ operations administration and management (iOAM) data regarding a plurality of traffic flows in the network. The iOAM data comprises entropy values for the plurality of traffic flows. The device receives network topology information indicative of network paths available in the network. The device generates a machine learning-based entropy topology model for the network based on the received iOAM data and the received network topology information. The entropy topology model maps path selection predictions for the network paths with entropy values. The device uses the entropy topology model to cause a particular traffic flow to use a particular network path.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
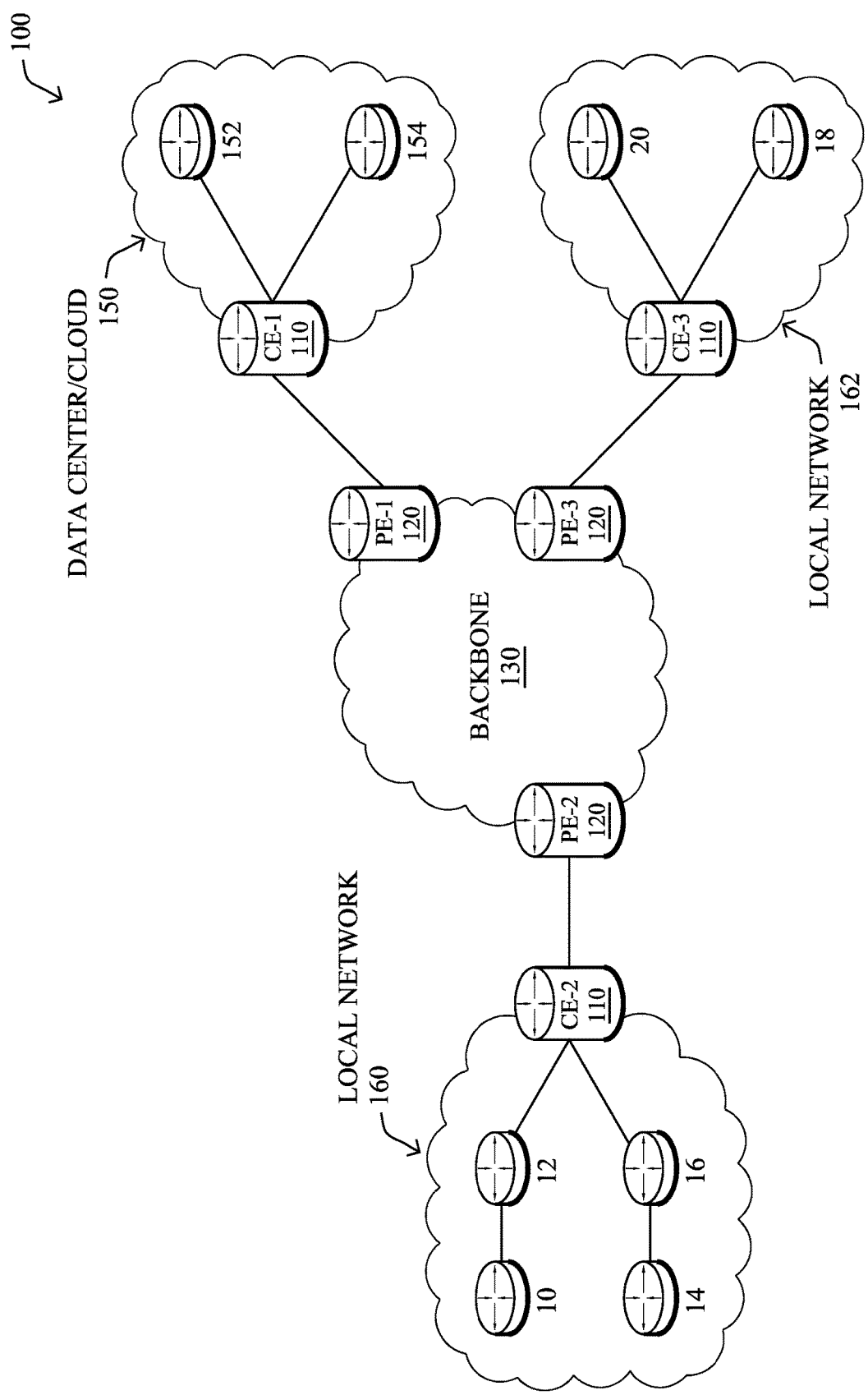

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
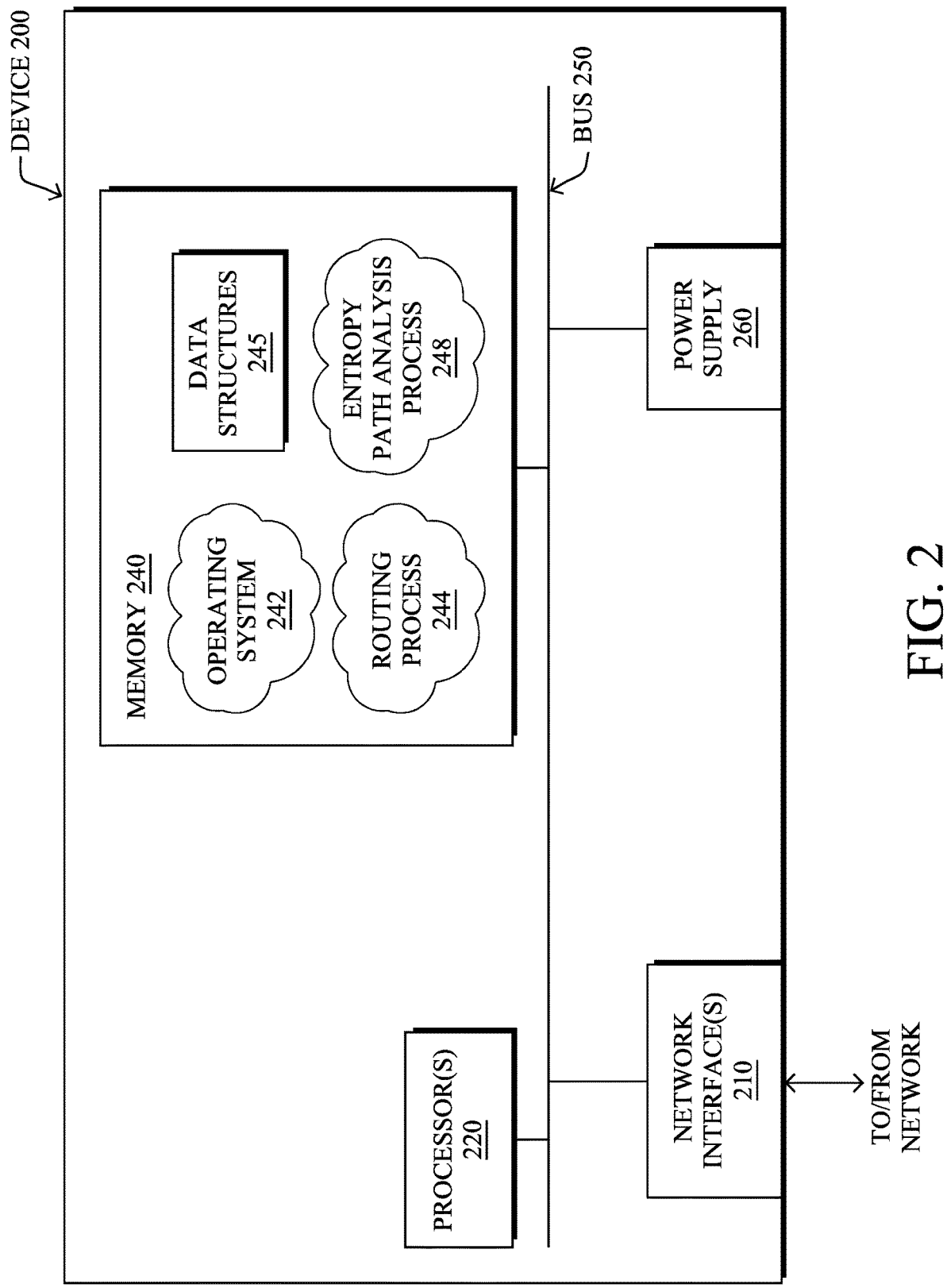
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, an entropy path analysis process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), generalized MPLS (GMPLS), etc., each as will be understood by those skilled in the art.

Routing process 244 may also utilize extensions to the IGP (e.g., IS-IS, OSPF, etc.), that allow IGP messages to carry MPLS label information, to enable segment routing. In general, segments in a segment routed network may fall into one of two categories: node segments and adjacency segments. Adjacency segments generally represent the local interface between a given node and an adjacent neighbor. Notably, adjacency segments do not need to be unique among the different nodes, as adjacency segments only require local significance to the particular node. Node segments, in contrast, are global in nature and use unique identifiers to represent node segment endpoints. When used in conjunction with MPLS, segments (e.g., node and adjacency segments) may be treated as labels, whereby a node may either "push" a new segment/label onto the stack, "pop" (e.g., remove) the top segment/label from the stack, or "swap" the top label of the stack with another label.

Routing process 244 may further use Equal-Cost Multi-Path (ECMP) routing to select which path a given traffic flow should take in the network. For example, service providers offering VPN services are expected to have multiple paths (e.g., ECMP paths) between ingress PE (iPE) routers and egress PE (ePE) routers that are commonly provisioned with VPN services. In such scenarios, any intermediate/transit node with multiple (e.g., ECMP) paths to an egress PE can use some selected information as input for hashing in order to decide the egress interface for packet forwarding. For example, this information can be either L3/L4 details from the packet, entropy labels, or 3/5/7-tuple entities.

Entropy labels, for example, are "random" label values included in a header field (e.g., an IP header or a MPLS label stack) of a packet to aid ECMP based load-balancing ("flow entropy"). Without entropy labels in a network where devices (e.g., label-switching routers (LSRs)) are performing ECMP solely on the basis of the header field, packets with the same forwarding information (e.g., header/label stack) will typically all follow the same path since most ECMP implementations use the forwarding information (e.g., header/label stack) as the input to hash-based, load-balancing processes. When multiple flows have the same forwarding information this means they cannot be effectively load-balanced. Entropy labels solve this problem by giving the source router the ability to "tag" different flows with different entropy label values, resulting in different headers/label stacks for different flows and better ECMP load-balancing.

Entropy path analysis process 248 includes computer executable instructions that, when executed by processor(s) 220, utilize machine learning techniques to model the entropy topology of the network based on in-situ, operations, administration, and management (iOAM) data. In general, iOAM allows for the collection of various flow characteristics (e.g., the complete path taken, etc.) by piggy-backing the data collection in the packet headers themselves of actual user traffic. This is in contrast to out-of-band approaches that may gather characteristics by introducing new packets into the network, such as probe packets, and is a complementary approach. In various embodiments, process 248 may use iOAM data with topology information regarding the network to form an entropy topology model that maps path selection predictabilities to entropy values. In other words, the generated model may be able to predict which path will be selected for a given flow in view of the characteristics of the flow.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

Example machine learning techniques that may be used to construct and analyze such an entropy topology model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

As noted above, iOAM allows for the recording of the complete path traversed within the packet header itself. This is in contrast to other out-of-band approaches (e.g., LSP ping, etc.) that can be used to query the entropy details along the path. By leveraging this information in combination with topology information for the network, the techniques herein can be used, for example, to predict the path a traffic flow could take in the network and potentially Machine Learning-Derived Entropy Path Graph from iOAM Data The techniques herein leverages in-situ data collection with machine learning to predict the path that a traffic flow could potentially take in networks that use ECMP and similar mechanisms. In some aspects, the techniques herein leverage path information collected by iOAM from actual data traffic and construct a path graph using flow identification modulated by entropy values. In other words, the techniques can be used to construct an entropy topology model of the network and use machine learning to determine the path predictability for a given flow entropy (or vice versa). In further aspects, out-of-band techniques, such as probing, can be used to validate and/or refine the model. Additionally, the model predictions can be used to influence traffic steering in the network across multiple paths for better efficiency.

Specifically, according to one or more embodiments of the disclosure as described in detail below, a device in a network receives in-situ operations administration and management (iOAM) data regarding a plurality of traffic flows in the network. The iOAM data comprises entropy values for the plurality of traffic flows. The device receives network topology information indicative of network paths available in the network. The device generates a machine learning-based entropy topology model for the network based on the received iOAM data and the received network topology information. The entropy topology model maps path selection predictions for the network paths with entropy values. The device uses the entropy topology model to cause a particular traffic flow to use a particular network path.

Illustratively, the techniques described herein may be performed by hardware, software, and/or firmware, such as in accordance with process 248, which may include computer executable instructions executed by the processor 220 (or independent processor of interfaces 210) to perform functions relating to the techniques described herein, e.g., in conjunction with routing process 244.

Figure 3:
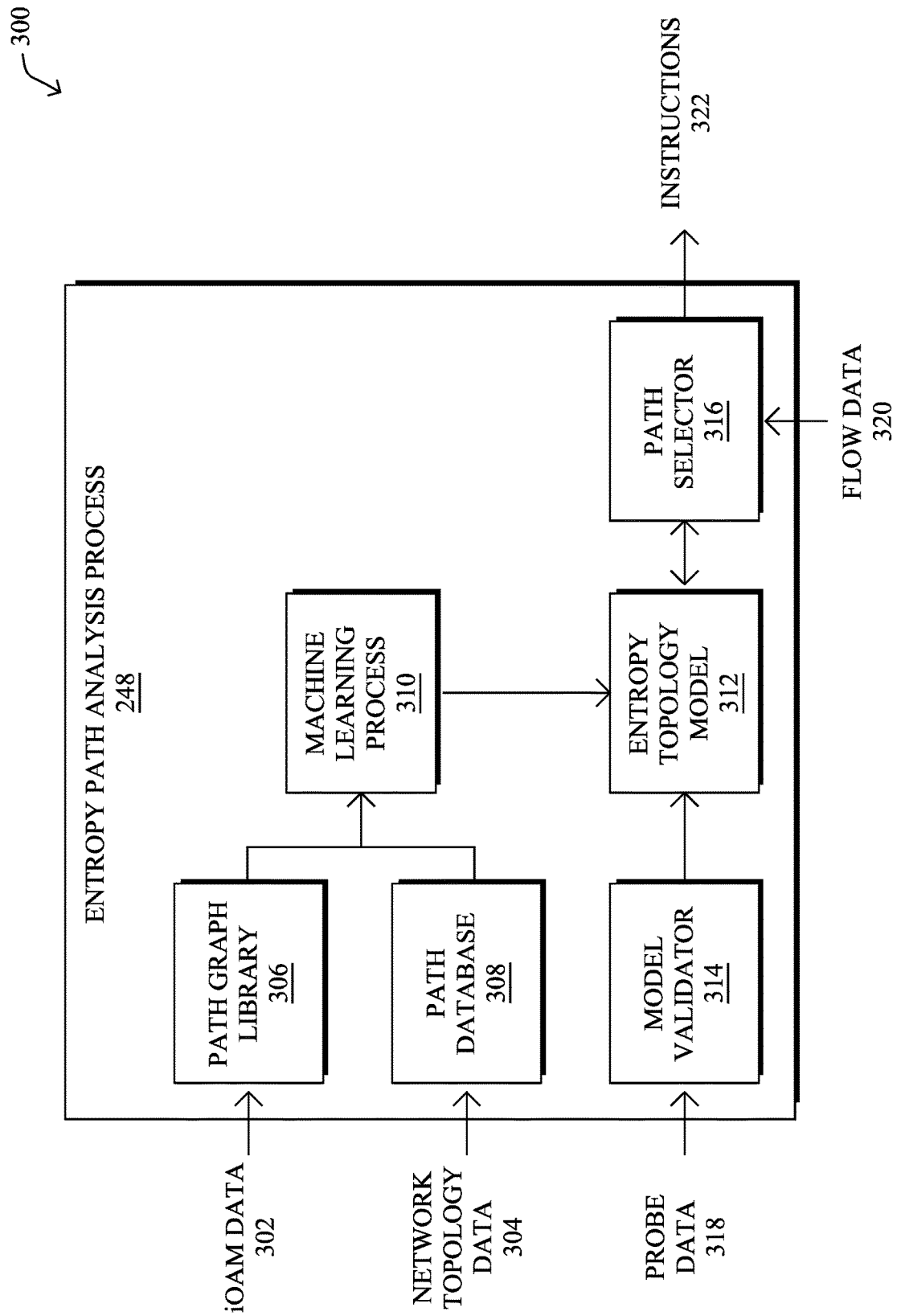
FIG. 3 illustrates an example architecture for performing entropy path analysis.

Operationally, FIG. 3 illustrates an example architecture 300 for performing entropy path analysis, according to various embodiments. As shown, entropy path analysis process 248 may include any number of sub-processes and interact with any number of data stores either locally or across multiple devices (e.g., in a distributed manner).

Notably, in environments enabled with iOAM or similar in-situ collection mechanisms, process 248 may be executed either by a standalone server in the network or can co-exist on a device that performs multiple functions (e.g., an analytics platform, etc.).

As shown, entropy path analysis process 248 may receive iOAM data 302 collected from any number of traffic flows in the network. In general, iOAM data 302 may be collected through the use of metadata appended to actual user/data traffic in the network. This differs, for example, from other out-of-band collection techniques (e.g., probing, etc.). Example information that can be captured in iOAM data 302 may include, but is not limited to, path tracing information (e.g., for ECMP networks, etc.), service/path verification, traffic matrix information, path metrics (e.g., delay, loss, jitter, etc.), entropy details, custom information (e.g., geo-locations, etc.), and the like. For example, a data packet may be appended to include a Node-ID field, an ingress interface field, an egress interface field, a proof of transit field, a sequence number field, a timestamp field, a custom data field, an entropy label, etc., that can be updated as the data packet is communicated through the network.

Thus, based on the received iOAM data 302, entropy path analysis process 248 now has path information for the various flows in the network, as well as other details regarding the flow (e.g., application, ingress, egress, entropy details, etc.). In turn, entropy path analysis process 248 may use iOAM data 302 to construct a path graph library 306. In other words, path graph library 306 may store the iOAM-generated traffic features such as the actual network paths traversed by the flows.

Entropy path analysis process 248 may also receive network topology data 304 indicative of the actual topology of the network. Depending on the type of network, network topology data 304 may be sourced in a number of different ways. For example, network topology data 304 may be derived from an IGP database in the network, BGP-Link State (BGP-LS) information, or the like. In turn, entropy path analysis process 248 may store the received topology data 304 in a path database 308.

According to various embodiments, entropy path analysis process 248 may include a machine learning process 310 that constructs an entropy topology model 312 for the network based on the path graph library 306 and path database 308. Generally, machine learning process 310 may be operable to map the flows (hops) from path graph library 306 to the end-to-end topology from path database 308 at any point of time and, in turn, construct entropy topology model 312.

In some embodiments, entropy topology model 312 may be configured to take as input flow information for a particular traffic flow (e.g., from the l2/l3/l4/l5 flow header, including entropy), and output a path predictability for each path in the network. For example, in view of the flow information for a particular flow, entropy topology model 312 may output percentages or numbers per path in the network that represent the likelihood of the traffic flow following that path. In some embodiments, these predictions may also be time-based and denote the likelihood of a given path being taken at certain times of the day, days of the week, etc. In further embodiments, entropy topology model 312 may also be operable to predict the probability for a possible range of entropy that suits an application to take a specific network path, and/or vice-versa.

By way of example, machine learning process 310 may use Bayesian techniques to generate entropy topology model 312. Example implementation features are detailed below:

1) The path graph library 306 may be constructed to have numerous fields from iOAM data 302 and more (l2/l3/l4/l5 header info, ingress/egress nodes, etc.), to allow for increased granularity for machine learning process 310.

Machine learning process 310 may use logistic regression and/or other machine learning techniques, to help to identify the flow-specification granularity in a given network, to feed into the immutable fields that define an ECMP topology. Notably, some networks use only IP addresses, some networks use transport-level ports, some networks use flow labels, etc., and machine learning process 310 can identify what type of network this is for ECMP and which fields are relevant. All in all, each entry in the graph would point to one or more paths from ingress to egress.

2) Each path per graph entry in model 312 be assigned a "score" (e.g., on a scale from 1-100, etc.). In some cases, the score may also be weighted such as based on "time duration", time stamp, path usage in bytes, latency, etc.

2a) Every time, a path per entry is used in a given timeslot (e.g., morning from 6:00 AM-9:00 AM, etc.), machine learning process 310 may increase its score by a certain number or percentage. For example, the score may be (re)computed as follows:

Score (+)=Path Usage in Bytes (80%)+Path Latency (10%)+Path Usage Duration (10%), where:

Path Usage (B)=10 per 1 MB

Path Latency=10 if <100 ms; 5 if 100-150 ms; 2 if 150-200 ms; etc.

Path Usage=10 per minute

2b) Every time, the path availability is impacted or path experiences packet drops etc., machine learning process 310 may also decrement the score by a certain number or percentage, as well. For example, the score may be decremented as follows:

Score (−)=Path Packet Drops (50%)+Path Availability per 24 hrs (50%)

Path availability=0 in case of 100% available; 10 in case of 99% available etc.

Path Packet drops=0 in case of 0 drops; 10% in case of 100 packets drop, etc.

3) Path Reliability—machine learning process 310 may also generate model 312 to take into account other events such as failures that cause network topology changes, as they would impact the path availability. Such external events could be received as an additional input source for model 312.

4) If the network topology changes (e.g., one or more paths become unavailable, etc.) then the output(result) of model 312 could point to the available set of paths based on scores.

According to various embodiments, model 312 may also be expanded to take path telemetry information as input, to enable capacity planning in the network. For example, entropy path analysis process 248 may include a path selector 316 that receives flow data 320 regarding a particular path in the network and use model 312 to predict the core link utilization for the flow (e.g., based on ECMP prediction from the derived topology graph). In turn, path selector 316 may cause the corresponding traffic flow to take a certain path in the network by generating one or more instructions 322. For example, based on the service level agreement (SLA) requirements of the application indicated by flow data 320, as well as the path predictions from model 312, path selector 316 may generate an appropriate set of instruction(s) 322 to influence the path traversed by the flow in the network.

Alternatively, or in addition thereto, any node in the network can query model 312 for the entropy for all ECMP paths available between ingress and egress for various purposes including troubleshooting and/or path validation. Further, such a system can be a feeder of policy from a 'proactive' service. This being an ongoing learning process, changes in the network topology will not affect the functionality and can even help strengthen the learning.

As an additional embodiment, entropy path analysis process 248 can also use out-of-band mechanisms, to validate entropy topology model 312 and/or update model 312. For example, entropy path analysis process 248 may include a model validator 314 that receives probe data 318 from any number of different probing mechanisms (e.g., S-BFD, LSP Ping, etc.), to validate model 312. For example, model validator 314 may assess different probe packets sent in the network with different entropy values (and potentially adjusting the TTLs), to see if the probe packets flows over the paths predicted by model 312. In some embodiments, this determination may be used as additional input to machine learning process 310, to further refine entropy topology model 312.

FIGS. 4A-4D illustrate the use of an entropy topology model to affect traffic flows, in accordance with various embodiments. As shown, consider an example MPLS/SR/SRv6 domain 400 that comprises a set of devices/nodes R1-R9. For simplicity, also assume that a machine learning (ML) agent (e.g., another device 200 is present in the network and implements the techniques described previously.

From the received information regarding domain 400, the ML agent may maintain the following:

TABLE 1

| Flow | Entropy | Ingress | Egress | Path Graph |
|---|---|---|---|---|
| Src/Dst/VRF | Flow Label, Entropy Label, Source port, Destination port, Extension Header, etc. | R2 | R9 | Path Details: P1 = {R2-R3-R5-R7-R9}; P2 = {R2-R3-R5-R6-R8-R9}; P3 = {R2-R4-R5-R6-R7-R9; . . . |

In other words, the ML agent may know the possible paths from R2 to R9, as well as the entropy information associated with flows between R2 and R9. From this information, the ML agent can model the entropy topology of domain 400, to predict which path a given flow will take, in view of its flow information. In turn, the ML agent may send out one or more instructions, to influence the actual path taken by a flow (e.g., to avoid congestion in domain 400, avoid SLA violations, etc.).

Figure 4A:
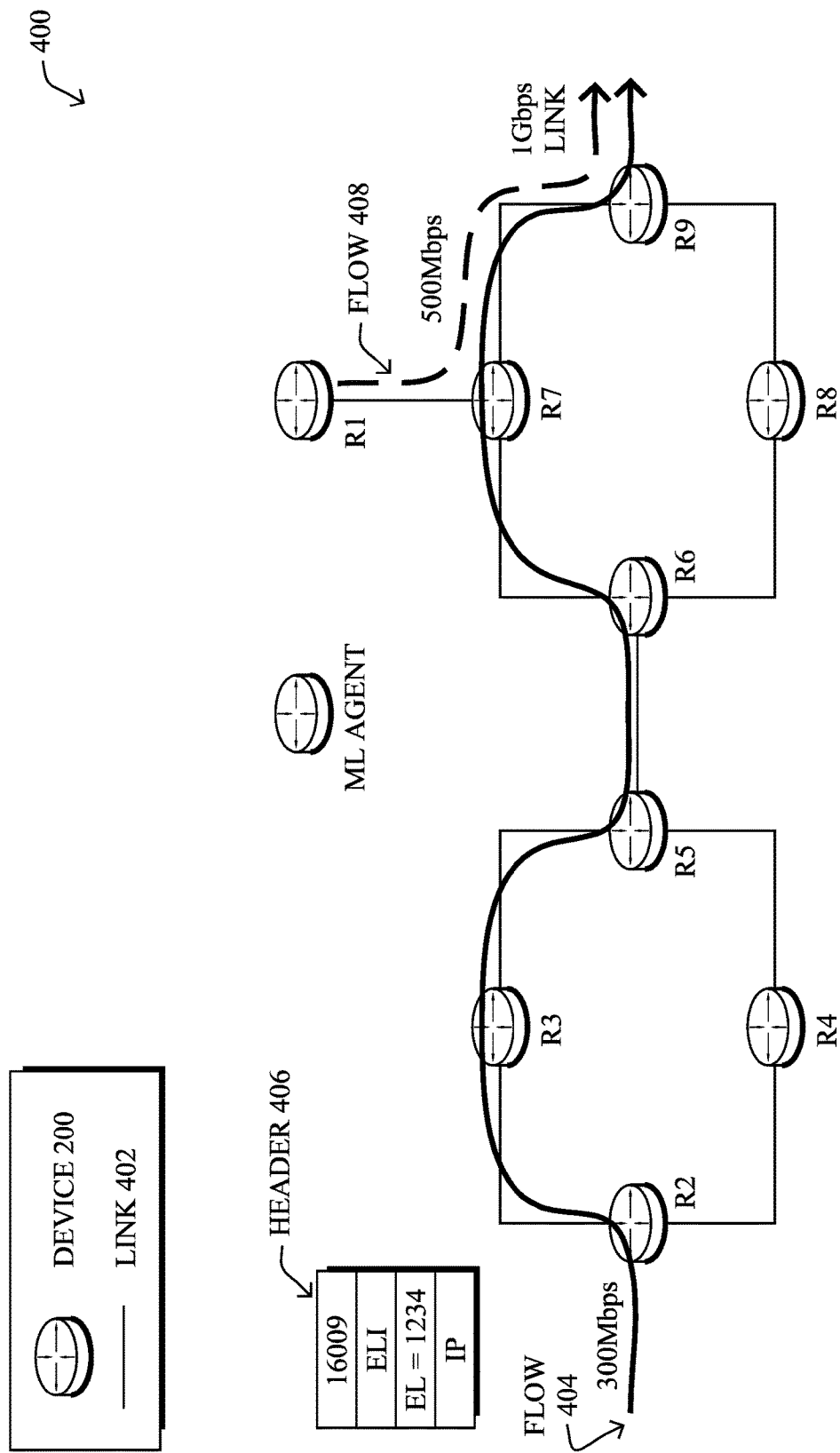
FIGS. 4A-4D illustrate the use of an entropy topology model to affect traffic flows.

By way of example, assume the following with respect to FIG. 4A:
The link R7-R9 has a capacity of 1 Gbps
There is a 300 Gbps flow 404 with header 406 that traverses the path R2-R3-R5-R6-R7-R9.
There is a 500 Gbps flow 408 that traverses the path R1-R7-R9.

Thus, flows 404 and 408 are consuming a total of 800 Mbps bandwidth of the 1 Gbps available across link R7-R9. As would be appreciated, the two flows are shown for purposes of simplicity and any number of actual flows may be flowing across link R7-R9.

Figure 4B:
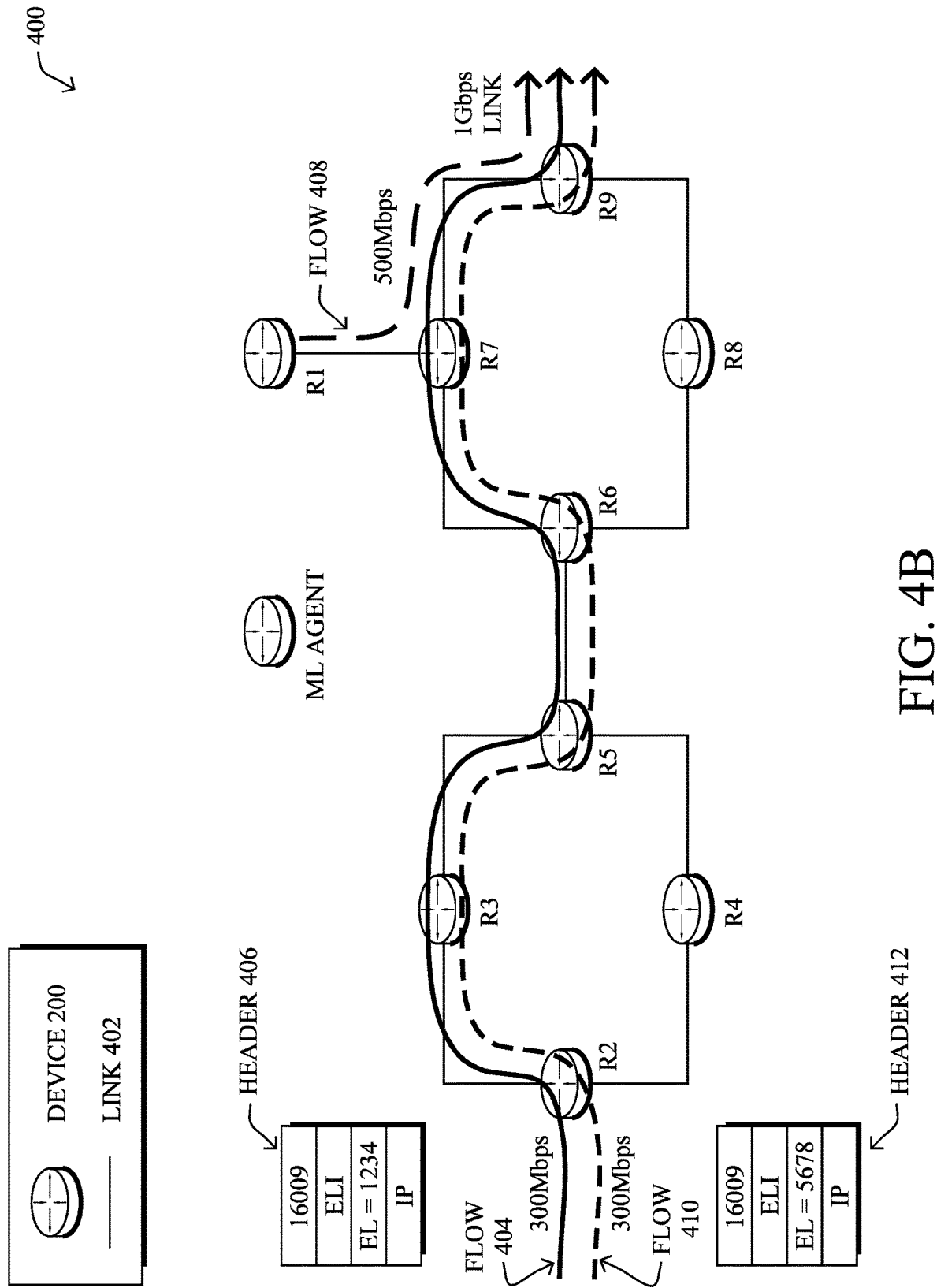

As shown in FIG. 4B, now assume that a new 300 Mbps flow 410 is received by R2 that is also to egress R9. In a typical scenario, R2 may perform a local computation and insert an entropy label of value 5678 (EL=5678) into header 412 of flow 410, to cause load balancing to occur. However, R2 does not have control or intelligence over how a given transit node will actually load balance its flows. Thus, the situation shown may occur whereby R6 load balances flow 410 over R7-R9, thereby causing congestion across link R7-R9.

Figure 4C:
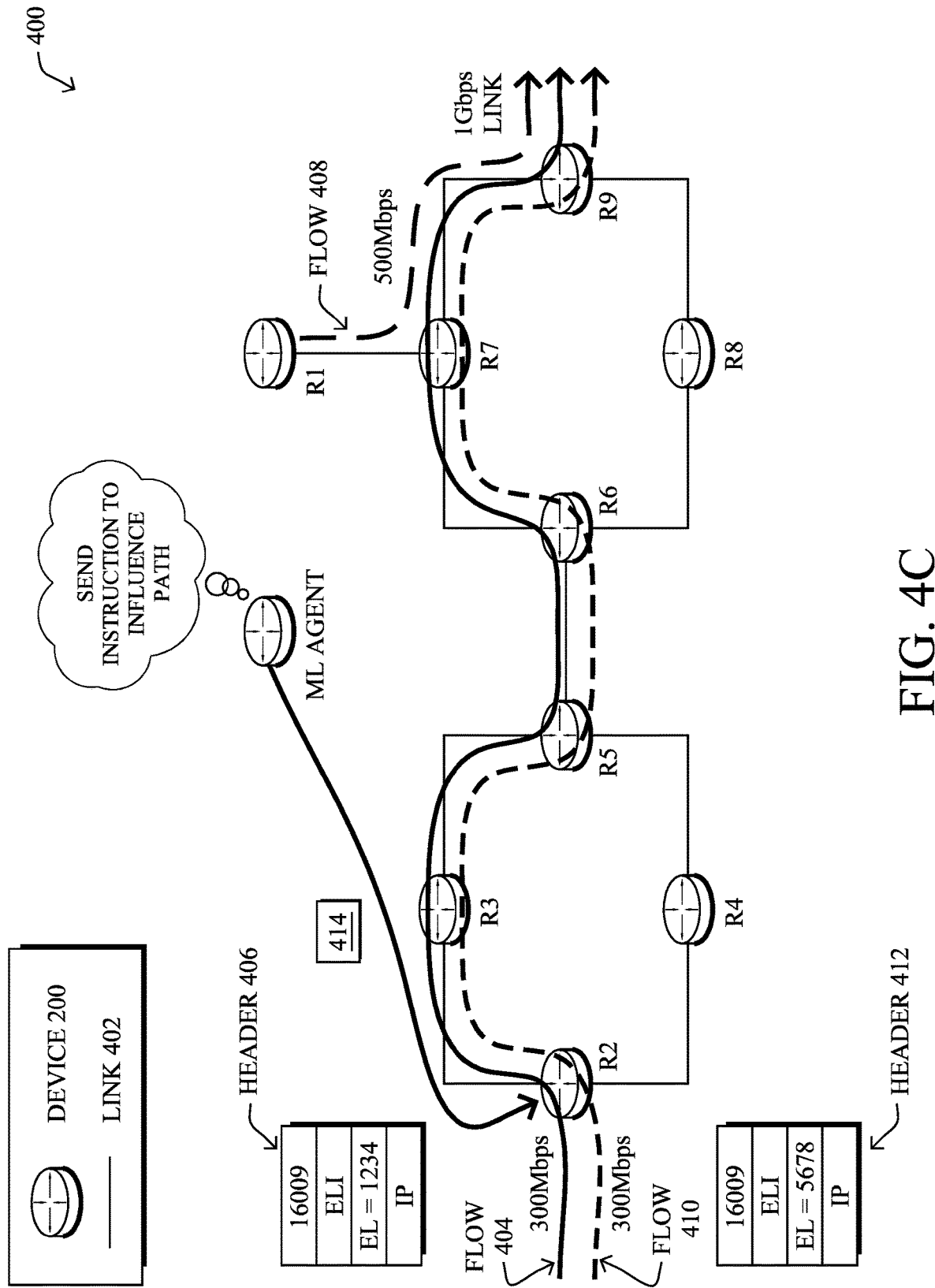

As shown in FIG. 4C, the ML agent may use the techniques herein to avoid the situation depicted in FIG. 4B. In particular, the telemetry/flow information of flow 410 may be sent to the ML agent to identify the possible entropy range that will result in moving the traffic over to the path comprising R6-R8-R9. In other words, given the information about flow 410, the ML agent may use its entropy topology model of domain 400 to determine the entropy range that has the highest likelihood of causing R6 to send flow 410 via R8-R9, instead.

Figure 4D:
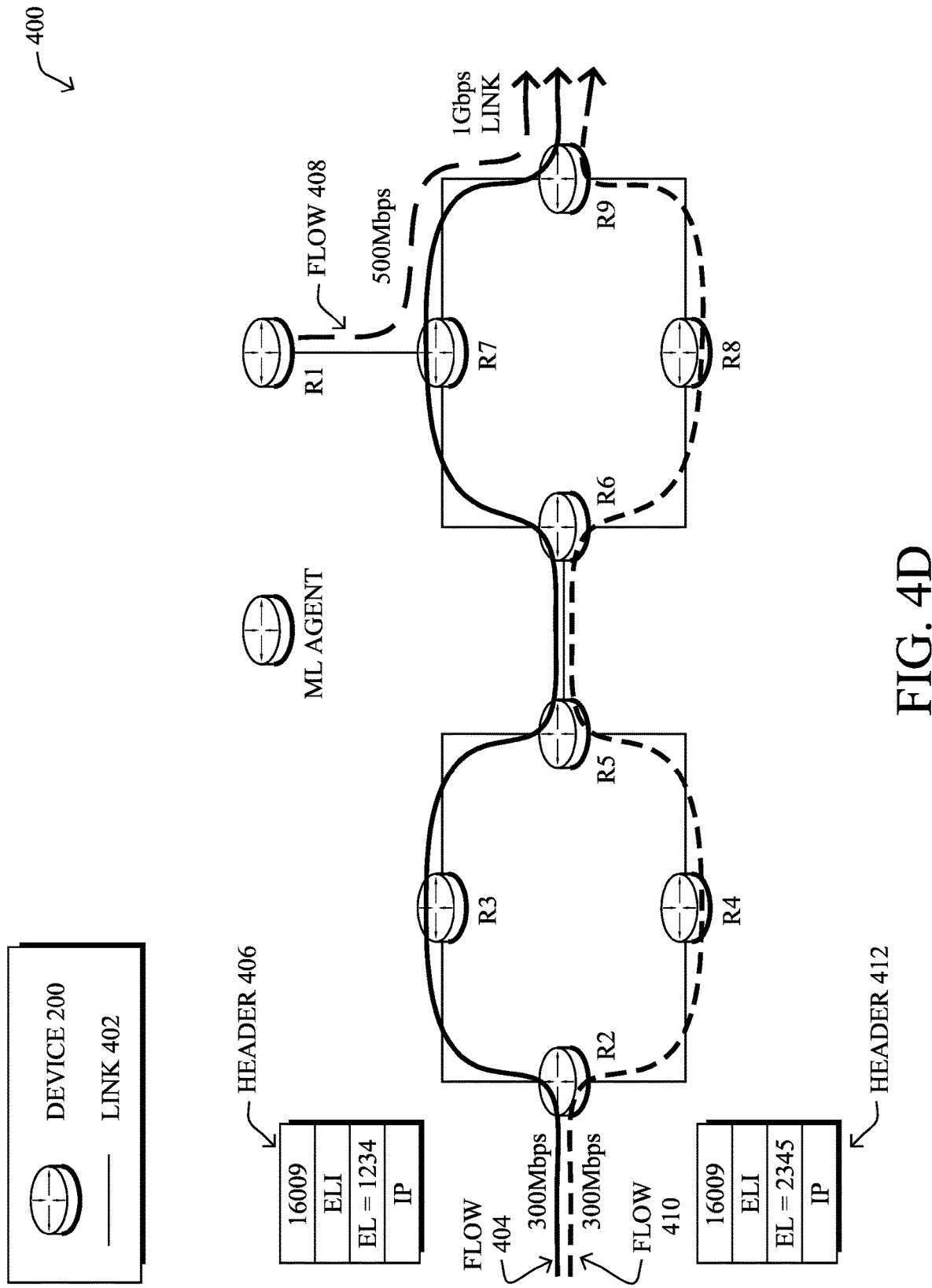

In turn, the ML agent may send a corresponding instruction 414 to R2 that causes R2 to use a different entropy label value for flow 410. More specifically, as shown, R2 may use a different entropy label value (e.g., EL=2345) in the header 412 of flow 410 that was predicted by the ML agent to cause flow 410 to traverse R8-R9, instead. Consequently, as shown in FIG. 4D, flow 410 may be routed via R8-R9 based on the new entropy label in header 412, thereby avoiding congestion over link R7-R9.

In further embodiments, a similar approach could be used in Virtual PE Forwarder (vPEF)/VPP scenarios where the ML agent can instruct the forwarder or the application traffic to use the relevant entropy details, such as source address, to influence the path taken.

Figure 5:
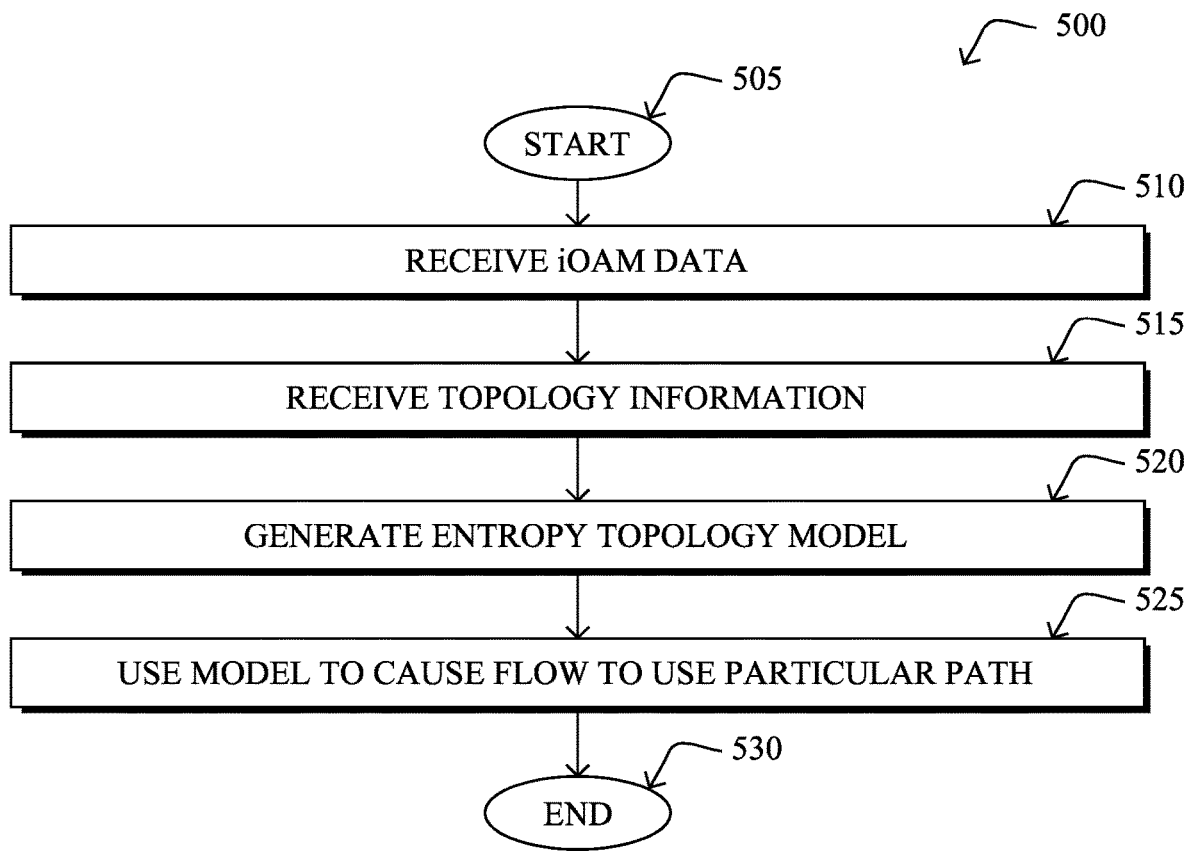
FIG. 5 illustrates an example simplified procedure for using an entropy topology model.

FIG. 5 illustrates an example simplified procedure for using an entropy topology model, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may receive in-situ operations administration and management (iOAM) data regarding a plurality of traffic flows in the network. Generally, the iOAM data may be captured by piggybacking metadata onto the actual data flows (e.g., conveying user traffic). For example, the iOAM data may include the entropy values for the plurality of traffic flows, data indicative of the paths taken by the flows, the ingress and egress interfaces, etc.

At step 515, as detailed above, the device may receive topology information regarding the network. For example, the device may receive Interior Gateway Protocol (IGP) database information, Border Gateway Protocol-Link State (BGP-LS) information, or other such information indicative of the actual topology of the network.

At step 520, the device may generate a machine learning-based entropy topology model for the network based on the received iOAM data and the received network topology information, as described in greater detail above. In various embodiments, the entropy topology model may map path selection predictions for the network paths with entropy values. In other words, based on the topology of the network itself and the received iOAM data (e.g., the entropy values and paths of the traffic flows), the device may train a model that maps path predictions and entropy values. Thus, for example, the model may predict the most likely path that a flow will take using a certain range of entropy values and/or determine the appropriate range of entropy values to cause the flow to likely flow over a specified path.

At step 525, as detailed above, the device may use the entropy topology model to cause a particular traffic flow to use a particular network path. For example, the device may send an instruction that causes a computed entropy value to be inserted into the header of the particular traffic flow. In other words, to cause the flow to take the particular path, the device may use the entropy topology model to determine the entropy label that is most likely to cause the network to route the flow along the desired path. In turn, the device may send an instruction to a router in the network to adjust the entropy label of the flow (e.g., to relieve congestion in the network, to satisfy an SLA of the flow, etc.). Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage iOAM data to derive per-flow, path graphs based on entropy. In some aspects, the techniques may employ logistic regression or another machine learning approach to predict the entropy, link utilization based on the entropy for path and capacity planning, flow-specific granularity used for ECMP in the network, and the like. In further aspects, active probing may be used to validate and/or update the model. Such predictions can be used, for example, to influence the actual path taken by a flow (e.g., to avoid network congestion, ensure that an SLA of the flow is met, etc.).

While there have been shown and described illustrative embodiments that provide for using machine learning to derive an entropy path graph using iOAM data, it is to be understood that various other adaptations and modifications may be made within the spirit and scope of the embodiments herein. For example, while certain embodiments are described herein with respect to using certain machine learning models, other machine learning techniques can be used, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, in-situ operations administration and management (iOAM) data packet regarding a plurality of traffic flows in the network, wherein the iOAM data packet comprises entropy values for the plurality of traffic flows;
receiving, at the device, network topology information indicative of network paths available in the network;
generating, by the device, a machine learning-based entropy topology model for the network based on the received iOAM data packet and the received network topology information, wherein the entropy topology model maps path selection predictions for the network paths with entropy values; and
using, by the device, the entropy topology model to cause a particular traffic flow to use a particular network path.

2. The method as in claim 1, wherein using the entropy topology model to cause the particular traffic flow to use a particular network path comprises:
causing, by the device, a selected entropy value to be inserted into a header of the particular traffic flow when ingressing the network based on the path selection prediction for the particular network path that is mapped with the selected entropy value.

3. The method as in claim 1, further comprising:
receiving, at the device, probing data from out-of-band probes sent via the network; and
using, by the device, the probing data to validate the entropy topology model.

4. The method as in claim 3, further comprising:
updating, by the device, the entropy topology model based on the probing data.

5. The method as in claim 1, wherein the path selection predictions are associated with time periods.

6. The method as in claim 1, wherein the particular network path is selected in part on a service level agreement (SLA) associated with the particular traffic flow.

7. The method as in claim 1, wherein the particular network path is selected to avoid congestion in the network.

8. The method as in claim 1, wherein the iOAM data packet is gathered using headers of the plurality of traffic flows, and wherein the traffic flows convey user traffic in the network.

9. The method as in claim 1, wherein the network topology information comprises Interior Gateway Protocol (IGP) database information or Border Gateway Protocol-Link State (BGP-LS) information.

10. The method as in claim 1, wherein the entropy values are random labels included in a header field of the iOAM data packet.

11. An apparatus, comprising:
one or more network interfaces to communicate with a segment routed network;
a processor coupled to the one or more network interfaces and configured to execute one or more processes; and
a memory configured to store a process executable by the processor, the process when executed operable to:
receive in-situ operations administration and management (iOAM) data packet regarding a plurality of traffic flows in the network, wherein the iOAM data packet comprises entropy values for the plurality of traffic flows;
receive network topology information indicative of network paths available in the network;
generate a machine learning-based entropy topology model for the network based on the received iOAM data packet and the received network topology information, wherein the entropy topology model maps path selection predictions for the network paths with entropy values; and use the entropy topology model to cause a particular traffic flow to use a particular network path.

12. The apparatus as in claim 11, wherein the apparatus uses the entropy topology model to cause the particular traffic flow to use a particular network path by:
  causing a selected entropy value to be inserted into a header of the particular traffic flow when ingressing the network based on the path selection prediction for the particular network path that is mapped with the selected entropy value.

13. The apparatus as in claim 11, wherein the process when executed is further operable to:
  receive probing data from out-of-band probes sent via the network; and
  use the probing data to validate the entropy topology model.

14. The apparatus as in claim 11, wherein the path selection predictions are associated with time periods.

15. The apparatus as in claim 11, wherein the particular network path is selected in part on a service level agreement (SLA) associated with the particular traffic flow.

16. The apparatus as in claim 11, wherein the particular network path is selected to avoid congestion in the network.

17. The apparatus as in claim 11, wherein the iOAM data packet is gathered using headers of the plurality of traffic flows, and wherein the traffic flows convey user traffic in the network.

18. The apparatus as in claim 11, wherein the network topology information comprises Interior Gateway Protocol (IGP) database information or Border Gateway Protocol-Link State (BGP-LS) information.

19. The apparatus as in claim 11, wherein the entropy values are random labels included in a header field of the iOAM data packet.

20. A tangible, non-transitory, computer-readable media having software encoded thereon, the software when executed by a device in a network operable to perform a process comprising:
  receiving, at the device, in-situ operations administration and management (iOAM) data packet regarding a plurality of traffic flows in the network, wherein the iOAM data packet comprises entropy values for the plurality of traffic flows;
  receiving, at the device, network topology information indicative of network paths available in the network;
  generating, by the device, a machine learning-based entropy topology model for the network based on the received iOAM data packet and the received network topology information, wherein the entropy topology model maps path selection predictions for the network paths with entropy values; and
  using, by the device, the entropy topology model to cause a particular traffic flow to use a particular network path.

* * * * *

UNITED STATES PATENT AND TRADEMARK OFFICE
CERTIFICATE OF CORRECTION

PATENT NO. : 10,904,149 B2
APPLICATION NO. : 16/555149
DATED : January 26, 2021
INVENTOR(S) : Carlos M. Pignataro et al.

It is certified that error appears in the above-identified patent and that said Letters Patent is hereby corrected as shown below:

In the Specification

Column 10, Line 2, please amend as shown:
numerous fields from iOAM data 302 and more (l2/l3/l4/l5

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*